July 17, 1956

E. W. YETTER 2,755,434

MAGNETIC MEASURING SYSTEM

Filed Aug. 16, 1950

INVENTOR.
EDWARD W. YETTER

BY

Woodcock and Phelan

ATTORNEYS

July 17, 1956

E. W. YETTER 2,755,434

MAGNETIC MEASURING SYSTEM

Filed Aug. 16, 1950

INVENTOR.
EDWARD W. YETTER
BY
Woodcock and Phelan
ATTORNEYS

July 17, 1956  E. W. YETTER  2,755,434
MAGNETIC MEASURING SYSTEM
Filed Aug. 16, 1950  4 Sheets-Sheet 3

INVENTOR.
EDWARD W. YETTER
BY
*Woodcock and Phelan*
ATTORNEYS

July 17, 1956     E. W. YETTER     2,755,434
MAGNETIC MEASURING SYSTEM

Filed Aug. 16, 1950     4 Sheets-Sheet 4

INVENTOR.
EDWARD W. YETTER
BY
Woodcock and Phelan
ATTORNEYS

United States Patent Office 2,755,434
Patented July 17, 1956

2,755,434

MAGNETIC MEASURING SYSTEM

Edward W. Yetter, Ardmore, Pa., assignor to Leeds and Northrup Company, Philadelphia, Pa., a corporation of Pennsylvania Application August 16, 1950, Serial No. 179,763

18 Claims. (Cl. 324—43)

This invention relates generally to electrical indicating, measuring and controlling, and it relates particularly to the indicating, measuring and controlling of magnetic fields and of the electrical currents that induce magnetic fields. The magnetic field may originate externally of the apparatus comprising the invention, in which case the field itself is the quantity to be measured, or it may be induced electromagnetically within the measuring apparatus, in which case measurement of the magnetic field constitutes also a measurement of the current or voltage giving rise to it.

It has heretofore been proposed to apply the magnetic field, or voltage, to be measured to unbalance in some way an electromagnetic circuit and then to restore the circuit to its original balanced condition by applying thereto another, a known magnetic field or voltage. Thus, measurement of the unknown quantity is accomplished by balancing against it an equal and opposite neutralizing quantity of known magnitude and direction. The provision of such a neutralizing quantity and its accurate determination present no difficulty, but it is difficult sometimes to know precisely when the balance point has been reached, and the over-all accuracy of measurement is limited by the accuracy with which the balance point can be determined. Thus, a general object of the invention is to determine accurately the exact condition of balance between a quantity to be measured and a known quantity.

More specifically, it has heretofore been proposed to measure magnetic fields, or electrical currents that induce those magnetic fields, by balancing them against known fields or currents or voltages in such a way that the condition of balance will be reached by minimizing the net magnetic field resulting from unbalance. It has been proposed, furthermore, to apply the aforesaid residual unbalance field to magnetically saturable core elements for the purpose of minimizing it to determine the balance point of the known and unknown quantities.

Certain difficulties heretofore encountered are avoided in accordance with the invention, and more precise balancing suited for accurate indicating and control purposes is achieved by utilizing changes due to the variation in impedance which, under circumstances to be described hereinafter, accompanies variation of the aforesaid unbalance magnetic field. Furthermore, it is sometimes advantageous to modulate the aforesaid unbalance magnetic field, preferably at power frequencies. Thus, a more specific object of the invention is to measure electrical currents, or magnetic fields, by employing for more precise direct measurement or balance-indicating purposes a voltage which is highly sensitive to variations in impedance of a circuit including a saturable magnetic element to which the magnetic field to be measured is applied and which field varies the aforesaid impedance. This impedance variation is used to modulate the phase, frequency and amplitude of a suitable source of high-frequency voltage.

Particularly where high-gain amplifiers are required to measure weak fields or currents representative of a condition to be measured, it is advantageous to employ a measuring system which is insensitive to extraneous magnetic or electrical fields. Such extraneous fields occur most commonly at the power frequency at which it is desired to operate a balancing motor for automatic measurement. Thus, a further object of the invention is to measure weak magnetic fields or electrical currents with a system which is peculiarly insensitive to extraneous electrical or magnetic fields particularly at the power-frequency. This object is achieved in one respect by a particular arrangement of windings having zero coefficient of coupling between windings and by a particular arrangement of saturable magnetic structures which arrangement cancels out fluxes developed by extraneous, external fields and is achieved in another respect by employing for measuring purposes a magnetic field of power-frequency which is so strong that if any small fraction of the aforesaid extraneous fields is added thereto, it will have little effect.

More particularly, it is an object of the invention to measure electromagnetic energy by applying a high-frequency magnetic field to saturate a saturable magnetic structure at or near the peak values of said high-frequency magnetic field, further applying to said structure a magnetic field representative of the difference between a magnetic field or voltage to be measured and a known magnetic field or voltage adjustable to be equal and opposite thereto, and applying an alternating magnetic field to said structure, whereby the impedance presented to the source of the high-frequency field is varied in accordance with the difference between said field or voltage to be measured and said known field or voltage: the voltage of the source of the high-frequency field is modulated to produce modulation components which have a phase relative to the alternating field which reverses with reversal in direction of the difference between the field or voltage to be measured and the known field or voltage. At least one such modulation component whose phase is determined by the direction of said difference and whose amplitude is related to the extent of said difference in one direction or the other is detected and the known field or voltage is thereupon adjusted to reduce said difference to zero.

Other objects and advantages of the invention will be apparent from the following more detailed description thereof with reference to the accompanying drawings, in which.

Figure 1:
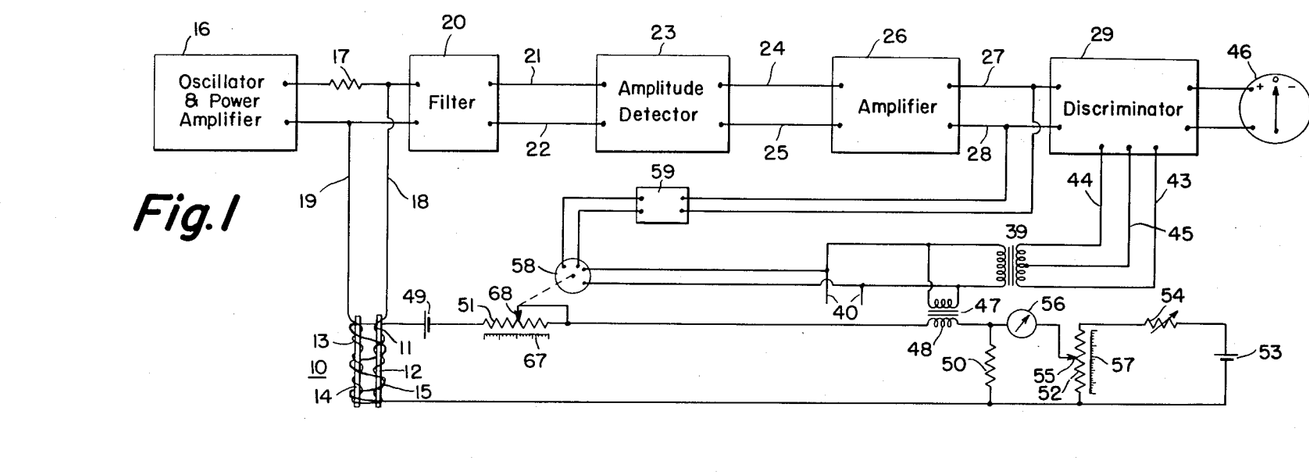
Fig. 1 is a schematic diagram of a measuring system embodying the invention.

Referring to Fig. 1, a magnetic field to be measured is applied to detector 10 comprising exciting coil 11 having a magnetic core 12, exciting coil 13 having a magnetic core 14 and neutralizing coil 15 enclosing both of cores 12 and 14. Coils 11 and 13 have equal numbers of turns and are wound in opposite directions so that substantially no voltage due to current flowing therethrough is induced in coil 15. Conversely, current flowing through coil 15 will induce no voltage in coils 11 and 13. Coils 11 and 13 and their respective cores have been shown spaced apart substantially for clearness, but it is contemplated that, in practice, these coils and cores shall be in close juxtaposition. It will be apparent that the magnetic field being measured will be neutralized only in the direction of the magnetomotive force of coil 15, and that the measured component of the unknown field will be that along the axis of coil 15. Thus, the direction of the measured field will be determined by the direction of coil 15 and there remains only the problem of determining its magnitude.

Oscillator and power amplifier 16 may be of any suitable well known type adapted to supply an output voltage, referred to herein as an exciting voltage, which may be at some convenient frequency such as, for example, 800 cycles per second. Resistor 17, which may have a resistance of the order of several thousand ohms, may if desired be a part of the output circuit of power amplifier 16 and may consist in whole or in part of the internal resistance of the source of exciting voltage. Conductor 18 connects coil 11 of detector 10 with power amplifier 16 through resistor 17, while conductor 19 connects coil 13 of detector 10 to power amplifier 16.

The new method herein described depends on the fact that the impedance of the exciting coils 11 and 13 to the fundamental component of exciting voltage is not constant, but is a function of the net steady field in the Permalloy cores 12 and 14. For a sufficiently large unbalanced field, the cores remain completely saturated in the same direction during the entire cycle of exciting voltage and so produce the condition of minimum impedance of the coils. If the unbalance is reduced so that the core during some part of the cycle is not saturated, the effective impedance to the fundamental component will be increased. The impedance will be a maximum when the unbalance is reduced to zero. The slope of the curve of impedance versus field will be zero at balance, positive for positive unbalance, and negative for negative unbalance. Furthermore, if the internal impedance of the source of exciting voltage is high, the fundamental component of voltage across the exciting coils will also vary with the field, and the slope of the exciting voltage versus field curve will exhibit the same characteristics as the slope of the impedance curve. It will be apparent that anything which decreases the impedance of coils 11 and 13, to cause more current to flow through conductors 18 and 19, will reduce the voltage therebetween due to the voltage drop in resistor 17, a modulation effect to be described hereinafter.

Conductors 18 and 19, and consequently the output of oscillator and power amplifier 16 after passing through resistor 17, are connected to one side of filter 20 which may be of the well known band-pass type adapted to pass well the frequency of the output voltage of oscillator and power amplifier 16 and a narrow band of frequencies on either side thereof and to attenuate to a negligible value other frequencies. The output of filter 20, assumed for convenience to be 800 cycles modulated as described hereinafter, is transmitted by conductors 21 and 22 to amplitude detector 23 which may be of any suitable well known type.

The output of detector 23, comprising the modulation of the 800 cycle voltage applied thereto, is transmitted by conductors 24 and 25 to amplifier 26 which may be of any suitable well known type adapted to amplify the modulation frequency to any desired degree. The output of amplifier 26 is applied through conductors 27 and 28 to discriminator 29 which preferably is of type shown in Fig. 4 and specifically comprises a pair of electronic tubes 30 and 31 having grids 32 and 33 connected together and to conductor 27, while the midpoint of resistors 34 and 35 is connected to conductor 28. Resistors 34 and 35 in series are connected in parallel with resistor 36 which connects cathodes 37 and 38 of tubes 30 and 31, respectively. Resistor 35 may be adjustable so that conductor 28 may be connected at the exact electrical midpoint between cathodes 37 and 38.

Figure 4:
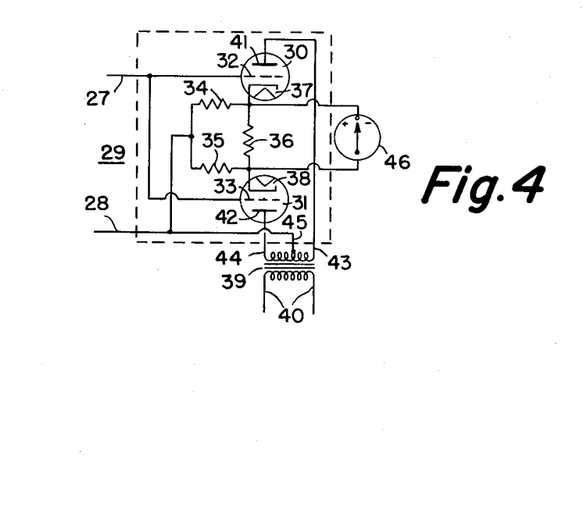
Fig. 4 is a more detailed schematic diagram of a portion of the apparatus shown in Figs. 1, 2 and 3.

Transformer 39 may be energized from any suitable electrical power line 40 which may, for convenience, be assumed to be a 60-cycle line. The output of transformer 39 is applied to plates 41 and 42 of electronic tubes 30 and 31, respectively, through conductors 43 and 44. A midtap on the output winding of transformer 39 is connected by conductor 45 to conductor 28 which is connected to the midpoint between cathodes 37 and 38. Thus, out-of-phase 60-cycle voltages will be applied to the plates of electronic tubes 30 and 31, while the grids of these tubes are driven in parallel by a synchronously related 60-cycle voltage.

As is well understood by those skilled in the art, this arrangement results in one of tubes 30 or 31 conducting current in a certain direction during the half cycle in which its plate and grid are both driven positive, the other tube being non-conducting during this half cycle because its plate is negative and during the other half cycle because its grid is negative. In this condition voltmeter 46 connected between cathodes 37 and 38 will read positive or negative, depending upon the polarity of the voltage applied to grids 32 and 33.

Now suppose that the voltage applied to discriminator grids 32 and 33 reverses in polarity due to a reversal in polarity of the modulation on the voltage at filter 20. The tube which previously conducted because its plate and grid simultaneously were driven positive now is non-conducting because when its plate is driven positive its grid will be negative, and when its grid is positive its plate will be negative. On the other hand, the other tube which previously was non-conducting now has its plate and grid driven positive simultaneously and it, therefore, conducts during one half cycle and causes meter 46 to read oppositely. Such an arrangement may be said to give sense to the indicator thus far described in that the direction of the reading of voltmeter 46 will depend upon the polarity of the signal being indicated. Thus, not only the magnitude but also the direction or sense of the signal will be indicated.

Transformer 47 (Fig. 1) energized from power line 40 supplies a voltage from secondary winding 48 to the neutralizing coil 15 of detector 10. The resulting current in coil 15 will modulate the voltage from oscillator and power amplifier 16 appearing between conductors 18 and 19 by varying the saturation of cores 12 and 14 so to vary the impedance of coils 13 and 15, and thereby vary the current through resistor 17.

Circuit elements whose purpose is to apply a neutralizing field to cores 12 and 14 through coil 15, and to measure the magnitude and direction of that field by measuring the current through coil 15, will now be described. Current from battery 49 passes through coil 15 by way of secondary 48 of transformer 47, fixed resistor 50, and variable resistor 51. The rheostat 51 is varied, either manually or automatically as later described, until meter 46 reads zero, thereby indicating that the magnetic field to be measured in the direction of coil 15 has been exactly neutralized by the magnetic field due to current from battery 49 passing through coil 15. The magnitude of this neutralizing field, and therefore the magnitude of the unknown field in the aforesaid direction, readily may be computed in a way well known to those skilled in the art provided that the current through coil 15 is known.

The magnitude and direction of the current through coil 15 may be measured in any well known way, preferably by measuring the voltage across fixed resistor 50 by means of calibrated slidewire 52 supplied with a constant current from battery 53 adjustable by rheostat 54. When contact 55 of slidewire 52 is adjusted, either manually or otherwise, to cause meter 56 to read zero, the voltage across resistor 50 and, therefore, the current through coil 15 may be read from suitably calibrated scale 57. The resistance of meter 56 may be much greater than the resistance of resistor 50 so that the current through the meter will be negligible. Another way to measure the current through coil 15 is to calibrate a scale 67 associated with variable resistor 51 so as to indicate current corresponding to the position of its sliding contact 68. When this latter method is employed, resistor 50 may be shorted and elements 52—57 omitted.

Operation of the system thus far described will result in modulation of the impedance and in amplitude modulation of the 800-cycle voltage appearing between conductors 18 and 19 in accordance with the 60-cycle voltage from transformer 47. It will now be shown with reference to Figs. 6, 7, 8 and 9 that this 60-cycle modulation, as it is detected and applied to discriminator 29 and indicated by meter 46, will depend for its polarity upon the direction of the unbalance magnetic field in cores 12 and 14. That is to say, meter 46 will read one way when rheostat 51 is adjusted to apply to coil 15 too much current to neutralize the unknown magnetic field, and it will read the other way when rheostat 51 is adjusted to apply too little current to coil 15.

A second and sometimes more important characteristic of this modulation of the 800-cycle exciting voltage applied to filter 20, also to be explained, is the great sensitivity with which it makes possible the indication of exact neutralization of the magnetic field to be measured by adjustment of rheostat 51. Briefly stated, this increased sensitivity arises from the fact that when the magnetic field to be measured is exactly balanced by the field from coil 15, no modulation at the fundamental frequency of the modulating voltage from power line 40 occurs, and the second and higher even harmonics of the modulating voltage which reach discriminator 29 are ineffective to produce a reading on voltmeter 46, whereas a slight unbalance of the magnetic field at coil 15 due to a very slight misadjustment of rheostat 51 will result in a small, but nevertheless finite, modulation at the fundamental frequency of power line 40 being amplified by amplifier 26 and applied to discriminator 29 to produce a readily discernible reading of voltmeter 46.

Figure 6:
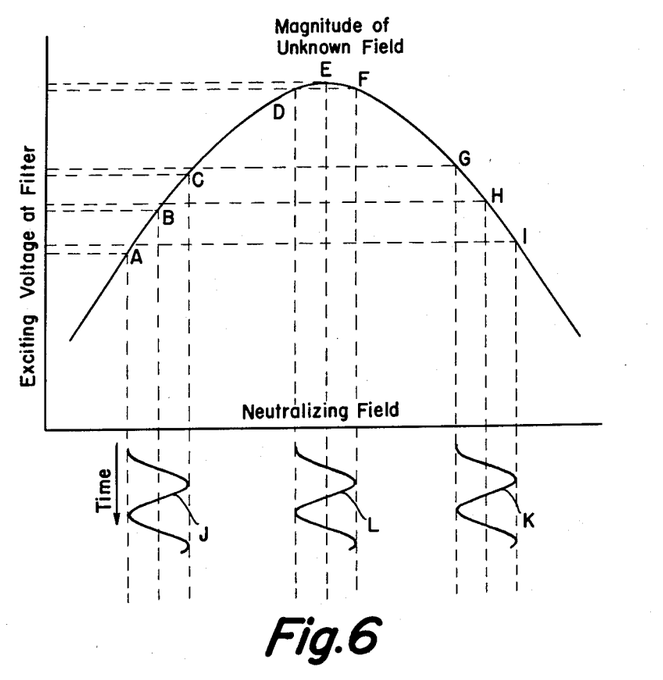
Figs. 6, 7, 8, 9 and 10 are charts useful in explaining the operation of the invention.

Referring to Fig. 6, suppose that detector 10 is placed in a magnetic field whose magnitude longitudinally thereof is indicated horizontally by the letter E. Suppose further that the neutralizing field from coil 15 as adjusted by rheostat 51 has some low value, such as that indicated horizontally by the letter B, and that transformer 47 temporarily is disconnected from line 40. Under these conditions cores 12 and 14 will be saturated to an apppreciable extent by the excess of the field to be measured over the neutralizing field, and the impedance of coils 11 and 13 will be low, so that a large current flows through conductors 18 and 19 resulting in a substantial voltage drop across resistor 17 and a relatively low voltage applied to filter 20 indicated vertically by the letter B.

For convenience, assume that the voltage output of oscillator and power amplifier 16 remains constant so that variations in the voltage applied to filter 20 will vary inversely with the current in resistor 17. Now suppose that rheostat 51 is readjusted until the magnetic field to be measured is exactly neutralized by the field from coil 15 as indicated horizontally at E. The saturation of cores 12 and 14 will not be affected either by the field to be measured or by the neutralizing field, and the impedance of coils 11 and 13, therefore, will be increased, the current through resistor 17 will be decreased, and the voltage applied to filter 20 will be increased to the value indicated vertically at E.

Suppose now that rheostat 51 is adjusted to produce from coil 15 a higher neutralizing field as indicated horizontally at H. Saturation of cores 12 and 14 will now result from the excess of the neutralizing field over the field to be measured thereby reducing the impedance of coils 11 and 13, increasing the current through resistor 17, and correspondingly reducing the voltage applied to filter 20, to the value indicated vertically at H because of the voltage drop in resistor 17.

It thus appears that the balance point of detector 10 could be determined by measuring and maximizing in some suitable way the magnitude of the voltage applied to filter 20. However, such a determination would not indicate the direction of unbalance, which might be objectionable for reasons discussed hereinafter, and it would be rather insensitive since a large deviation of the neutralizing field from the balance point, such as the deviation from point E to B in Fig. 5, would result in only a small percentage change in the exciting voltage as indicated by the relative vertical positions of B and E.

For an understanding of the way in which the 60-cycle modulation of the 800-cycle exciting voltage gives sense to the unbalance indication by meter 46 and at the same time greatly increases the sensitivity of such indication, suppose that the neutralizing field is again reduced to the value B by adjusting rheostat 51 and that transformer 47 is connected to power line 40. Now there will be superimposed upon the neutralizing field the 60-cycle field J from the voltage from transformer 47 and power line 40 applied through coil 15 to vary cyclically the neutralizing field between A and C. At the beginning of curve J, when the modulated neutralizing field is a minimum, the exciting voltage at filter 20 will be a minimum as indicated at A in Fig. 6, and at A' in Fig. 7. As the neutralizing field increases to its maximum value C in Fig. 6, the exciting voltage at filter 20 increases to its maximum value indicated at C in Fig. 6, and at C' in Fig. 7. Thus, as shown in Fig. 7, the exciting voltage will vary over a substantial range from A' to C' at the fundamental frequency of the wave J, which is the fundamental frequency of power line 40.

Suppose now that rheostat 51 is adjusted to produce a neutralizing field stronger than the unknown field, such as that shown horizontally at H in Fig. 6, and suppose further that a 60-cycle field K, identical to the field J, is now superimposed upon the neutralizing field at H. Starting at a minimum value of the wave K, the exciting voltage at filter 20 will be a maximum as indicated vertically at G in Fig. 6 and at G' in Fig. 9. As the magnetic field due to the wave K superimposed upon the neutralizing field H increases to a maximum indicated horizontally at I in Fig. 6, the exciting voltage decreases to a minimum indicated at I in Fig. 6, and at I' in Fig. 9.

Figure 7:
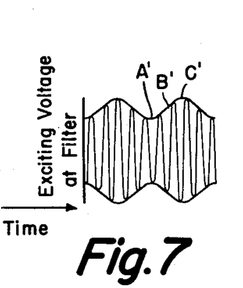
Figure 8:
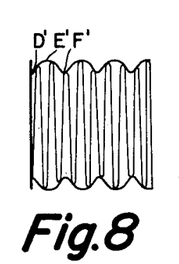
Figure 9:
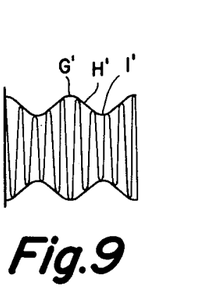

Thus, the variation in exciting voltage due to the 60-cycle variation in the neutralizing field is opposite as shown by comparison of Fig. 7, corresponding to a mean value of neutralizing field less than the field being measured with Fig. 9, corresponding to a mean value of neutralizing field greater than the field being measured. Therefore, meter 46 will indicate by the direction of its reading whether rheostat 51 has too much or too little resistance for exact balance of the field being measured and the neutralizing field because, as is well known to those skilled in the art, when the exciting voltage wave shown in Fig. 9 is passed through amplitude detector 23 the resultant 60-cycle wave applied to discriminator 29 will be 180° out of phase, commonly referred to as reversed in polarity, compared to the similar 60-cycle wave resulting from the application of the exciting voltage wave shown in Fig. 7 to the same detector and discriminator.

It has previously been shown that the direction of the reading of meter 46 depends upon the polarity of the voltage applied to discriminator 29, and it has now been shown that the unbalance indicating system thus far described has sense, or direction discrimination, since meter 46 will read in one direction if rheostat 51 is so misadjusted in one direction, and it will read in the opposite direction if rheostat 51 is misadjusted in the opposite direction. It will now be shown that there will be no 60-cycle modulation of the exciting voltage wave at filter 20, and therefore no reading of meter 46, when rheostat 51 is so adjusted that the mean neutralizing field from coil 15 is exactly equal in magnitude, but opposed in direction, to the unknown field. It should be noted that the curve B, E, H, in Fig. 6, is precisely symmetrical about its maximum value E since a certain percentage change in the neutralizing field from E in one direction will result in exactly the same change in impedance of coils 11 and 13, and therefore the same exciting voltage at filter 20, that the same change in the opposite direction would have produced. In other words, the magnetization curve of cores 12 and 14 will be symmetrical about the zero magnetization point within the range of magnetic fields being measured. For this symmetry to exist, cores 12 and 14 should be made of some material which does not retain to any substantial degree magnetization applied thereto. Also, to facilitate the measurement of very weak magnetic fields, it is desirable that cores 12 and 14 be made of some high-permeability, low-saturation alloy. Certain nickel-iron-cobalt alloys, known to the art under tradenames such as Permalloy, Hypernik, or MuMetal are preferable, but other suitable alloys will be known to those skilled in the art.

Suppose now that with rheostat 51 adjusted so that the neutralizing field from coil 15 is exactly equal and opposite to the field to be measured (represented horizontally at E in Fig. 6), a 60-cycle field L, identical to fields J and K, is applied through coil 15 so that this magnetic field is superimposed upon the neutralizing field E. Starting with a minimum value of the wave L, where the magnetic field from coil 15 is represented horizontally at D in Fig. 6 and the exciting voltage at filter 20 vertically at D in Fig. 6 and at D' in Fig. 8, the magnetic field from coil 15 increases with the increase in wave L to the maximum value E in Fig. 6 and E' in Fig. 8. Thereafter, as the wave L increases further to the value F in Fig. 6, the exciting voltage at filter 20 decreases to the value F in Fig. 6 and F' in Fig. 8. Thus, the envelope of the exciting voltage wave shown in Fig. 8 will have two maximums and two minimums for each cycle of the wave L. In other words, the modulation envelope of the exciting voltage at filter 20 will consist primarily of the second and higher even harmonics of the frequency from power line 40, and these even harmonics when detected by amplitude detector 23 and applied to discriminator 29 will not produce any reading of meter 46, as is well known to those skilled in the art.

As mentioned, the above-described indication by meter 46 will be much more sensitive to unbalance of the magnetic fields in detector 10, thereby making possible a more accurate measurement of the unknown magnetic field than would be possible without the 60-cycle modulation of the exciting voltage. Suppose that rheostat 51 is misadjusted to produce from coil 15 a neutralizing field indicated horizontally at D in Fig. 6. To detect this misadjustment of rheostat 51 without modulation of the exciting voltage would require the measurement and indication of a small percentage difference in the exciting voltage corresponding to the difference in the vertical positions D and E of Fig. 6. On the other hand, by employing a 60-cycle modulating voltage from power line 40 applied to coil 15, the misadjustment of rheostat 51 will be indicated by the difference between zero voltage at meter 46 with an exact balance of the magnetic fields in detector 10 and some finite reading of meter 46 which would result from the superimposition of a 60-cycle field on the neutralizing field D. It will be apparent that the gain of amplifier 26 may be great enough to detect readily this difference between zero signal and a small modulation signal with great sensitivity due to their great relative magnitudes, whereas the detection of the small percentage difference between the balance and unbalance condition without modulation of the exciting voltage would be more difficult.

A further advantage of modulating the exciting voltage with a voltage derived from power line 40 becomes apparent when the system hereinbefore described is made self-balancing by means of motor 58 energized through amplifier 59 by the voltage applied to discriminator 29.

It will be understood that the voltage at meter 46 could be used for control purpose, instead of the voltage applied to discriminator 29, since its direction depends upon the direction of the error to be corrected, but it is deemed preferable for certain applications to employ the very common two-phase servo motor 58 with one phase energized directly from power line 40, and the other phase energized by the amplified voltage between conductors 27 and 28. As is well understood by those skilled in the art, motor 58 is connected to rheostat 51, as by suitable gearing, not shown, to vary the current through coil 15 to correct the unbalance of the magnetic fields in detector 10 that gives rise to the voltage between conductors 27 and 28. Of course, if the fields in detector 10 are balanced, no voltage of the fundamental power frequency will be present between conductors 27 and 28, and the even-harmonic voltage there will not operate motor 58, which will remain at rest. If the magnetic fields in detector 10 become unbalanced in the reverse direction, the polarity of the voltage between conductors 27 and 28 will reverse, causing motor 58 to move to correct the unbalance.

As is well known, it is difficult to maintain a maximum position, such as that indicated at E in Fig. 6, by a conventional automatic balance system because of the requirement that the balance motor stand still at maximum voltage and operate in a predetermined direction with decreasing voltage. The curve B, E, H, in Fig. 6, may be inverted by some suitable well known means, but the resulting minimum point, corresponding to the maximum point E, will then be unstable due to the low signal level, being subject to drift with one or more of a number of small but unavoidably varying factors. In contrast, the system hereinbefore described will provide a definite minimum control voltage at meter 46 or at discriminator 29. This minimum being zero at the exact balance point of the magnetic fields in detector 10, any departure from this exact balance point will result in a control voltage whose polarity will depend upon the direction of the departure and, therefore, may be applied through amplifier 59 to motor 58 to move rheostat 51 in the proper direction to correct the departure and exactly balance the magnetic fields in detector 10. There remains for an exact measurement of the unknown magnetic field at detector 10 only the determination of the magnitude of the neutralizing field of coil 15 at this exact balance point by measuring the current through coil 15 as hereinbefore described.

Because of the open-core structure of cores 12 and 14, the measuring system hereinbefore described is particularly useful in measuring weak magnetic fields such as the magnetic field of the earth. A similar system exemplified by the apparatus shown schematically in Fig. 2 may be employed for measuring weak electrical currents or voltages by measuring the magnetic field resulting therefrom in a toroidal detector 60 which has a suitable coil 66 coupled to closed, toroidal cores 61 and 62, as is shown more clearly in Fig. 5. Cores 61 and 62, like cores 12 and 14, may be made of some suitable magnetically saturable material. Coil 63, corresponding to coil 15 in Fig. 1, and like coil 66, is wound around both of cores 62 and 61. Coils 64 and 65, corresponding to coils 11 and 13 in Fig. 1, are wound oppositely about cores 61 and 62 respectively, so that the coefficient of coupling is zero between coils 64—65 and either or both of coils 66 and 63. Hence, current passing through coils 64 and 65 will not induce voltage in coil 66 or coil 63, nor will a current passing through coil 66 or 63 induce a voltage in coils 64 and 65.

Toroidal cores 61 and 62 are particularly insensitive to extraneous magnetic fields. A uniform magnetic field will develop equal and opposite fluxes in diametrically opposite sectors of a toroid, which fluxes cancel out when the closed loop of the toroid is considered as a complete magnetic reluctance path. The earth's field, extraneous fields from power lines, fields from large inductive machinery or from iron near the measuring position do not disturb the desired signals which are obtained from coils 64 and 65 in a manner which will now be explained.

While the invention can measure currents or voltages applied to coil 66 when a single, toroidal magnetic structure is used, the impedance variations in coils 64—65 would then tend to be reduced because windings 64 and 65 could not be arranged to develop opposed magnetic fields and because of the resultant magnetic coupling between various windings on the single toroidal core. Further, impedance variations in the circuits connected to coils 63 and 66 would in that case be coupled into coils 64—65, producing extraneous impedance variations that would interfere with the impedance variations of coils 64—65 in response to the magnetic fields from coils 63 and 66. For best results, a double toroidal core structure is employed in accordance with the present invention.

Figure 5:
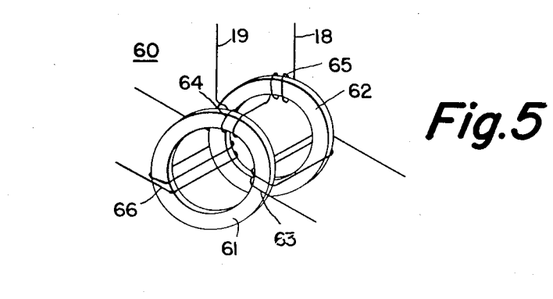
Fig. 5 is a perspective diagrammatic view of a portion of the structure shown in Figs. 2 and 3.

In detector 60 of Fig. 5, cores 61 and 62 are shown somewhat spaced in order to show the correct polarity of various windings thereon. However, cores 61 and 62 are actually in close juxtaposition so that a current through winding 66 or winding 63 will apply the same magnetic field to both cores.

Figure 2:
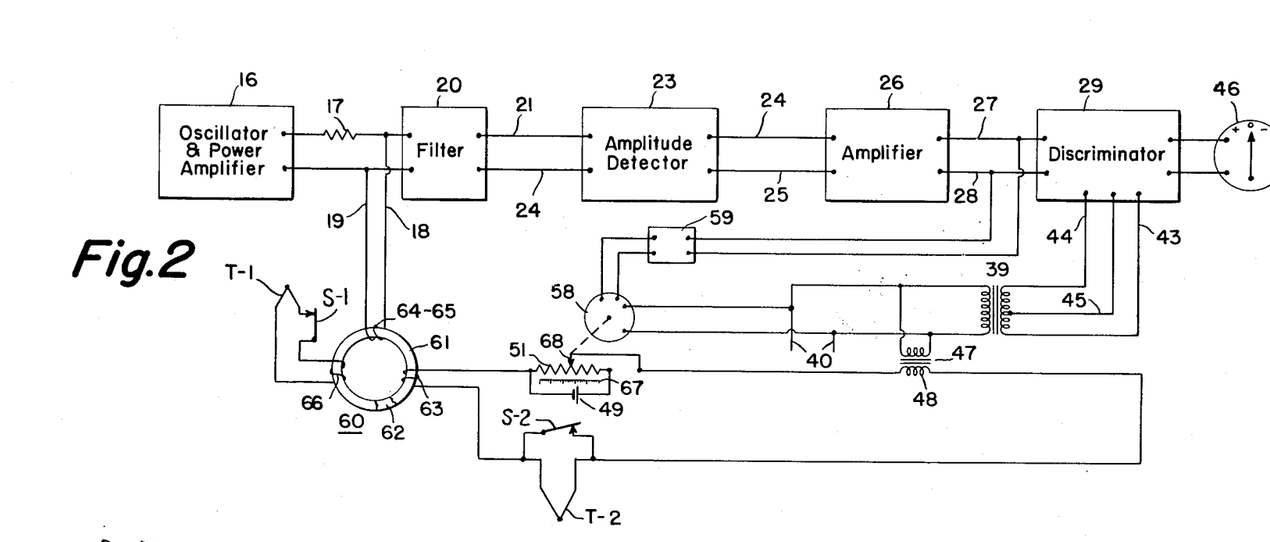
Fig. 2 is a schematic diagram of a modification of the system shown in Fig. 1.

When operated in the circuit of Fig. 2, a voltage or current to be measured is applied to winding 66 of detector 60 and will develop a magnetic field in cores 61 and 62, which magnetic field is indicated horizontally as abscissa E in Fig. 6 and is representative of the voltage or current to be measured. This source of voltage or current is generically illustrated by thermocouple T₁. The source of voltage to be measured can be T₂ in series-circuit with winding 63, with its voltage opposed by the known voltage from resistor 51. In this circuit a difference between the voltage to be measured and the known voltage produces a current in coil 63 and a magnetic field representative of said difference in voltages. This magnetic field can be visualized as variations in either direction from the neutralized position E in Fig. 6. Oscillator and power amplifier 16 applies an exciting voltage through resistor 17 and conductors 18 and 19 to windings 64 and 65. The exciting voltage across windings 64 and 65 is indicated vertically in Fig. 6 for various values of the neutralizing field. This exciting voltage will cause a current to flow through windings 64 and 65 which generates high-frequency alternating flux oppositely polarized in core 61 relative to core 62. This alternating flux is of a magnitude which reaches saturation in these toroidal cores at some point near the peak value of each half-cycle of this alternating flux. When no magnetic field is applied by winding 63 or by winding 66, the current through windings 64 and 65 will cause a maximum change in flux in the cores 61 and 62, and the impedance presented between conductors 18 and 19 will be at a maximum value. As a net magnetic field of either polarity is applied by winding 66, the current through windings 64 and 65 will cause a smaller flux change, and the impedance between conductors 18 and 19 will decrease from maximum value by a quantity substantially identical for a net magnetic field of either polarity. Assume that coil 66 of detector 60 develops a magnetic field indicated horizontally in Fig. 6 as abscissa E in the cores 61 and 62; assume further that the neutralizing field from coil 63 is adjusted by variable resistor 51 and has some low value, such as that indicated horizontally as abscissa B of Fig. 6, and that transformer 47 is temporarily disconnected from line 40. Under these conditions cores 61 and 62 will be affected to an appreciable extent by the excess of the field to be measured over the neutralizing field, and the impedance of coils 64 and 65 will be decreased so that a larger current flows through conductors 18 and 19, causing a substantial voltage drop across resistor 17.

Assuming that the voltage output of the oscillator and power amplifier 16 is substantially constant, this larger voltage drop in resistor 17 means that the voltage applied to filter 20 will decrease to that indicated vertically as ordinate B.

Assuming that the variable resistor 51 is readjusted, either manually or automatically as in Fig. 1, to produce from coil 63 (Fig. 2) a magnetic field greater than the magnetic field to be measured, such as the value indicated horizontally at H, cores 61 and 62 now will be affected by the excess of the neutralizing field over the field to be measured. This difference in magnetic fields causes a flux in cores 61 and 62 which again reduces the impedance of windings 64 and 65 and increases the current through the resistor 17. As described before, a corresponding reduction in the excitation voltage applied to filter 20 occurs with this decrease in impedance. When the magnetic field from coil 63 has a value indicated horizontally as abscissa H, the exciting voltage will decrease to the value indicated vertically as ordinate H.

It will be apparent as a matter of voltage division between resistor 17 and the impedance of windings 64 and 65 that the voltage supplied from oscillator and power amplifier 16 through resistance 17 and appearing across conductors 18 and 19 will vary in a manner corresponding to the variation of this impedance from maximum. These amplitude variations in the excitation voltage constitute an amplitude modulation thereof, and this modulated exciting voltage is passed by filter 20, detected in amplitude detector 33, and the modulation components thereof passed by conductors 24 and 25 to amplifier 26.

The impedance of windings 64 and 65 can be returned to its maximum value if a current is passed through winding 63 to develop a magnetic field opposed to that developed by winding 66. Assume now that variable resistor 51 is readjusted so that the magnetic field developed by the current in winding 63 is increased to a value exactly equal and opposite to the magnetic field developed by current in winding 66. At this point the neutralizing field will have a value indicated horizontally as abscissa E of Fig. 6, which coincides with the value for the magnetic field to be measured. With all residual flux neutralized in cores 61 and 62, the impedance of windings 64 and 65 will be increased to its maximum value. With a maximum value of this impedance, the excitation voltage applied to filter 20 will similarly be at a maximum value indicaed vertically as ordinate E. Any subsequent variation in the voltage or current applied to winding 66 will cause a residual flux representative of the change from equality to be developed in cores 61 and 62. This residual flux will cause a corresponding change in the impedance of windings 64 and 65, but there will be no indication of the direction of this residual flux inasmuch as the impedance variation for a given magnitude of net flux in cores 61 and 62 is identical for fluxes of both polarities.

From examination of this variation in excitation voltage with variation in the neutralizing field about a point of exact opposition to the magnetic field to be measured, it appears that the balance point of detector 60 could be determined by measuring and maximizing the excitation voltage applied to filter 20. However, such a determination would not indicate the direction of unbalance, and also would be rather insensitive as exact balance were approached since a large deviation of the neutralizing magnetic field from the balance point results in only a small percentage change in the exciting voltage. Greatly increased sensitivity can be achieved and a sense value can be given to the unbalance indication by applying an alternating magnetic field to the cores 61 and 62.

This alternating magnetic field is developed by an alternating voltage applied to winding 63 from secondary 48 of transformer 47. This alternating voltage causes an alternating current to flow through winding 63 which, in turn, develops an alternating magnetic field in cores 61 and 62. This magnetic field will modulate the net magnetic field in cores 61 and 62 about a value representative of the difference between the magnetic field to be measured and the neutralizing field, adding to the residual flux in one half-cycle of said alternating flux and subtracting therefrom in the following half-cycle. The half-cycle in which addition occurs and the corresponding half-cycle in which subtraction occurs will depend upon the direction of the residual flux in cores 61 and 62, and this difference can be utilized to give an indication of the direction or polarity of the residual flux. As previously described, the impedance of windings 64 and 65 will vary with change in flux in cores 61 and 62 and, consequently, when an alternating current flows in winding 63, a modulation effect will be applied to this impedance. Because of the foregoing addition and subtraction of fluxes or magnetic fields, this modulation will be in phase with the alternating current for one direction of residual flux and will be 180° out of phase for the other direction of residual flux, and will appear as an amplitude variation upon the exciting voltage from oscillator and power amplifier 16 through resistor 17.

For a more detailed explanation of the manner in which modulation of the magnetic field in cores 61 and 62 gives a directional sense to the unbalance indication of meter 46 and also the manner in which there is a great increase in the sensitivity at the balance point, it will be assumed that the neutralizing field applied by winding 63 is again reduced to value B, Fig. 6, by adjusting variable resistor 51 and that transformer 47 is now connected to power supply lines 40 to apply an alternating voltage to winding 63. An alternating magnetic field J now will be applied to cores 61 and 62 and will vary the net magnetic field in these cores about point B and between the minimum value A and maximum value C. At the beginning of curve J when the modulated neutralizing field is a minimum A, the exciting voltage at filter 20 will be at a minimum indicated as ordinate A in Fig. 6 and as A' in Fig. 7. As the neutralizing field increases to its maximum value C, the exciting voltage at filter 20 increases to its maximum value indicated as ordinate C in Fig. 6 and as C' in Fig. 7. Thus as shown in Fig. 7, the exciting voltage will vary over a substantial range from A' to C' at the fundamental frequency of wave J, which is the fundamenal frequency of power line 40.

Assume now that variable resistor 51 is readjusted, manually or automatically, to produce a neutralizing field stronger than the magnetic field to be measured, as shown horizontally at H in Fig. 6, and that the alternating voltage of transformer 47 applied to winding 63 develops field K identical to field J. Starting at a minimum value of the wave K, the exciting voltage at filter 20 will be a maximum as indicated vertically a G in Fig. 6 and at G' in Fig. 9. As the magnetic field due to the wave K superimposed upon the neutralizing field H increases to a maximum indicated horizontally as abscissa I, the exciting voltage decreases to a minimum indicated vertically as ordinate I in Fig. 6 and as I' in Fig. 9. Thus, the variation in exciting voltage due to the alternating magnetic field imposed upon the neutralizing field is opposite in phase, as shown in Fig. 9, to that shown in Fig. 7. The phase of the modulation envelope of Fig. 7 corresponds to a mean value of neutralizing field less than the field being measured, and the phase of the modulation envelope of Fig. 9 corresponds to a mean value of neutralizing field greater than the field being measured. Therefore, the phase of the modulation imposed upon the impedance of windings 64 and 65 and the phase of the corresponding modulation of the exciting voltage at filter 20 will be indicative of whether variable resistor 51 has too much or too little resistance for exact balance of the field generated by winding 63 with the field to be measured developed by winding 66.

The exciting voltage applied to filter 20 is detected in amplitude detector 23, increased in amplifier 26 and compared with the voltage on power line 40 in discriminator 29. As previously described, the phase relation of the fundamental modulation components of this exciting voltage with respect to the voltage on supply line 40 will be indicated by meter 46. Discriminator 29 and associated meter 46 may be omitted if the self-balancing system employing motor 58, slidewire 51, and scale 67 is used to produce the desired indication. The modulation component corresponding to the fundamental of the alternating voltage applied to winding 63 appears on conductors 27 and 28 and is applied to amplifier 59 and then to motor 58. Motor 58 is of the two-phase type also connected to power line 40 and moves in response to the phase relation between the modulation components appearing upon conductors 27 and 28 and the power line voltage, to adjust the sliding contact of variable resistor 51. This adjustment is polarized to vary the neutralizing field of winding 63 toward a value equal and opposite to the magnetic field to be measured.

When the magnetic field from winding 63 is in substantially exact opposition to the magnetic field from winding 66, the impedance of windings 64 and 65 will be at a maximum, and the modulation component at the fundamental frequency of the alternating voltage applied to winding 63 will be substantially zero. The disappearance of the fundamental component of the alternating modulation voltage at exact balance of the magnetic fields applied by windings 63 and 66 occurs because of the manner in which the impedance of coils 64 and 65 varies, as will now be explained.

The curve B, E, H, of Fig. 6, is precisely symmetrical about its maximum value E, which value represents adjustment of neutralizing field 63 to be exactly equal and opposite to the magnetic field to be measured. A certain percentage change in the neutralizing field from E in one direction will result in exactly the same change in impedance of windings 64 and 65, and therefore the same variation in excitation voltage at filter 20, that the same change in the opposite direction would have produced. In other words, the magnetization curve of cores 61 and 62 is symmetrical about the zero magnetization point within the range of magnetic fields being measured.

Each half-cycle of the alternating voltage applied to winding 63 will cause substantially identical decreases in the impedance, and the amplitude modulation of the exciting voltage which depends upon this impedance variation will likewise vary in the same manner for each half-cycle of the modulation voltage. Accordingly, the amplitude modulation on the excitation voltage applied to filter 20 will be predominantly the even harmonics of the fundamental modulation voltage. These harmonics of the line voltage will be detected and amplified as was the fundamental component, but as is well known in the art, even harmonics will not cause either a response of discriminator 29 and phase-indicating meter 46 or a movement of the balancing motor 58 when compared with the fundamental alternating voltage.

As previously described for cores 12 and 14, the core material of cores 61 and 62 should be some material which does not retain to any substantial degree the magnetization applied thereto, yet which has high permeability and saturates at a comparatively low level of magnetization.

Figure 3:
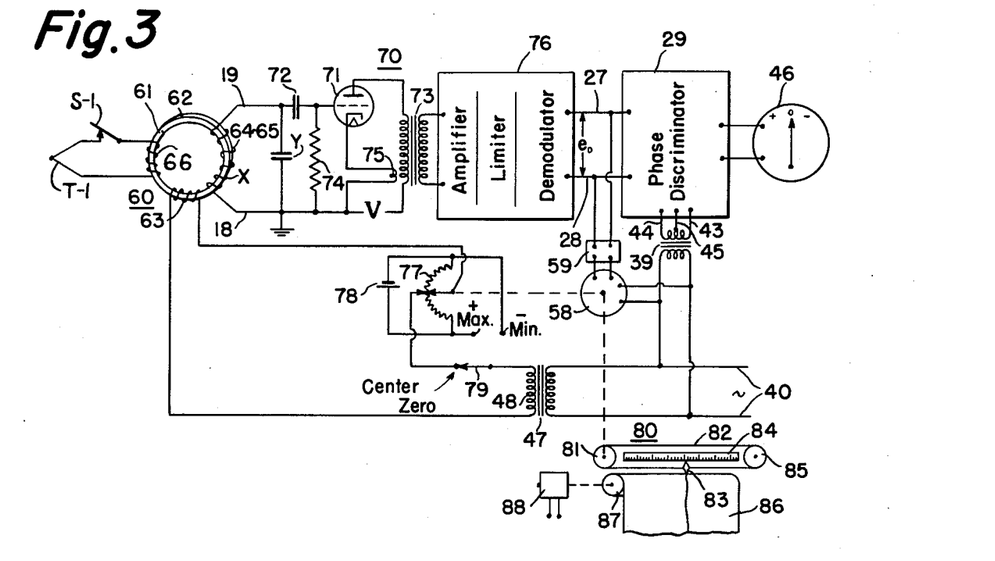
Fig. 3 is a schematic diagram of another embodiment of the invention.

Another embodiment of the invention is exemplified by the apparatus shown schematically in Fig. 3 which may be used for measuring electrical currents or voltages by measuring the magnetic field resulting therefrom in toroidal-core detector 60. As described for Fig. 2, detector 60 consists of a pair of toroidal cores 61 and 62 of saturable magnetic material, an input winding 66, excitation windings 64 and 65, and control winding 63. In this embodiment, the inductance X of excitation windings 64 and 65 is associated with capacitor Y to form a tuned circuit in the grid circuit of an oscillator 70. Oscillator 79 employs a vacuum tube 71 in a circuit wherein the feedback voltage required for oscillation is derived from coil 75 coupled to output transformer 73 in a polarity that will produce oscillation, though any suitable oscillator circuit can be used. Capacitor 72 is interposed between the grid of tube 71 and the tuned circuit XY so as to prevent the flow of any undesired direct current from triode 71 through windings 64 and 65 of the detector 60. The direct-current return for the grid of vacuum tube 71 is provided by resistor 74. The plate voltage necessary for operation of oscillator 70 is shown as voltage V.

As previously described, the windings 64 and 65 of detector 60 present an impedance between conductors 18 and 19 that varies with the net magnetic field in cores 61 and 62 and will be a maximum when there is zero net magnetic field. If a voltage or a current to be measured is applied to winding 66, a magnetic field representative of the condition to be measured will be applied to cores 61 and 62. This magnetic field is neutralized by a magnetic field developed by a current flowing through winding 63, and this current is adjusted, manually or automatically, by slidewire potentiometer 77 in circuit with winding 63 and with battery 78.

The impedance of windings 64 and 65 will vary in accordance with any difference between the neutralizing field and the magnetic field to be measured, but with only direct currents applied to winding 63 there will be no sense indication as to whether the neutralizing field is greater or smaller than the magnetic field to be measured. The desired sense indication is provided by applying an alternating voltage in series with the voltage from slidewire 77 and battery 78 to winding 63. This alternating voltage causes an alternating current in winding 63 which, in turn, applies an alternating magnetic field to the cores 61 and 62 of detector 60. As previously described, the impedance of windings 64 and 65 will be modulated in accordance with this alternating magnetic field, and the phase of the fundamental modulation component of this impedance relative to the original modulating voltage from transformer 47 will be in-phase or at 180° out of phase depending upon the direction of the difference between the neutralizing field and the magnetic field to be measured.

The inductance fraction of the impedance of windings 64 and 65 is utilized to vary the resonant frequency of tuned circuit XY. As the impedance of windings 64 and 65 is modulated in accordance with the unbalance between neutralizing field and field to be measured, the inductance thereof will undergo a corresponding modulation. Tuned circuit XY determines the frequency, $f_0$, of oscillator 70 according to the relation $f_0 = \frac{1}{2}\pi\sqrt{XY}$, and variations in inductance will produce an inversely corresponding frequency modulation of the output of oscillator 70. As inductance X decreases, the frequency increases. This frequency-modulated voltage is transferred by transformer 73 to circuit 76. Circuit 76 performs conventional electronic functions of amplifying the frequency-modulated wave, limiting the amplitude of this wave so that any extraneous amplitude-modulation or amplitude-type noise is removed therefrom, and demodulating the frequency-modulated wave in a conventional frequency-modulation discriminator. The discriminator output, $e_0$, will be the modulation components representative of the modulation of the impedance of windings 64 and 65 and will appear on conductors 27 and 28. To those skilled in the art, it will be obvious that the impedance variation also could be used to phase-modulate the excitation voltage.

Figure 10:
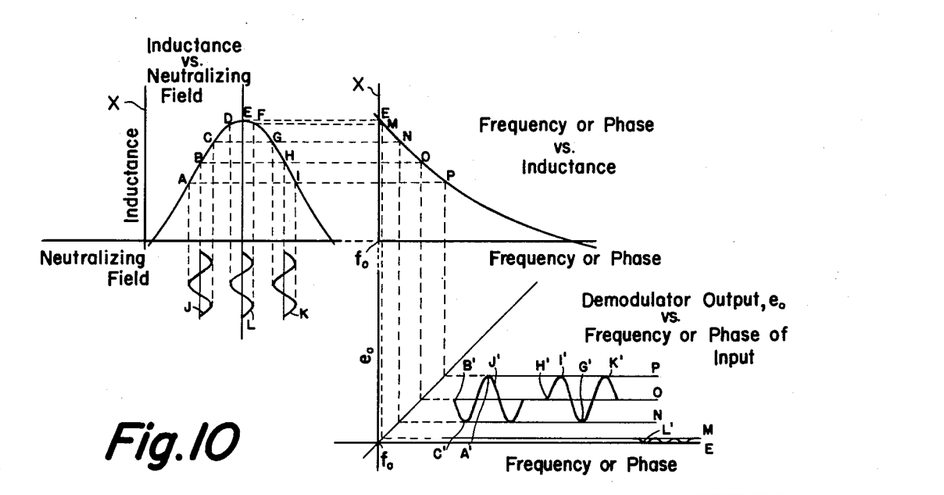

Referring to Fig. 10 if the neutralizing field has the value E, exactly equal to the magnetic field applied by winding 66, the inductance of windings 64 and 65 is at a maximum indicated vertically as ordinate E. The addition of alternating magnetic field L to cores 61 and 62 will cause this inductance X to decrease to value F as the alternating field increases to its maximum value. With the inductance X at value F, the frequency of oscillator 70 will be increased to value M. As the alternating field returns to zero and continues to its minimum value, the inductance X will increase to maximum value E and continue to decreased value D, and the frequency of oscillator 70 will increase to maximum value E and again decrease to value M. It is to be noted that the inductance and frequency variations complete two cycles during one cycle of alternating field L, so that even harmonics only and no fundamental of the modulating voltage will appear in the modulation of the exciting voltage, at exact balance of neutralizing and measured fields. The frequency variations from E to M act in the demodulator or frequency discriminator to produce an output wave L′ which is a low-amplitude second-harmonic of the modulating magnetic field L.

If the neutralizing field is reduced to B, magnetic field J, identical to L, will modulate the inductance X about B. As field J increases to maximum, the inductance increases the value shown at C. Decrease of the magnetic field through zero to minimum reduces the inductance through B to A. Variation in inductance X from B to C and back to A varies the frequency of oscillator 70 from O to N and back to P. This frequency modulation, when applied to the demodulator or frequency discriminator in circuit 76 will provide an output J′ which is the modulation component corresponding to the application of alternating field J about position B. If a neutralizing field is now increased beyond value E to H, magnetic field K, identical to magnetic field L, will modulate the inductance about H. As field K increases to maximum, the inductance X will decrease to value I, and as the magnetic field decreases through zero to its minimum value, inductance X will increase through H to value G. This inductance variation about value H will cause a frequency variation in the output of oscillator 70 from O to P and returning through O to N. When this last frequency modulation is applied to the demodulator, an output wave K′ representative of the frequency-modulation component of the exciting voltage applied to circuit 76 will be provided. It will be seen that adjustment of the neutralizing field from B to H has caused the modulation component to change phase 180° from that shown for J′. Hence, differences between the neutralizing field and the magnetic field to be measured will cause a residual flux in cores 61 and 62 which, in turn, allows the alternating magnetic field applied through winding 63 to modulate the inductance X and the frequency of oscillator 70 in a way which is representative of the direction of the residual flux. The phase relation of the demodulator output $E_0$, either wave J′ or wave K′, relative to the modulating magnetic fields J or K will be indicative of whether the neutralizing flux is less than or greater than the magnetic field to be measured.

If the neutralizing field is again returned to value E, alternating magnetic field L will again cause identical changes in inductance X for variations to either side of value E. Accordingly, the fundamental component of the frequency modulation of oscillator 70 will disappear at exact balance, and only the second and negligible amounts of higher harmonics will remain as shown by demodulator output L′.

In Fig. 3, the output of demodulator in circuit 76 is applied via conductors 27 and 28 to phase discriminator 29 and amplifier 59. When this output contains a fundamental modulation component, meter 46 will indicate whether it is in phase or reversed relative to the voltage applied from transformer 39, and motor 58 connected to amplifier 59 and to power line 40 will move in response to this fundamental modulation component, adjusting slidewire 77 so as to vary the current through winding 63 to provide a neutralizing field equal to the magnetic field to be measured. A fundamental component J′ will cause movement of slidewire 77 so as to increase the neutralizing field from winding 63. A fundamental component K' will cause movement of slidewire 77 so as to decrease the neutralizing field. At exact balance, there is no fundamental voltage, and the even harmonics of the modulating voltage cause no response of meter 46 or motor 58.

Switch 79 is provided to adapt the control circuit for various polarities of voltage or current applied to winding 66. A center-balance and full-scale for both polarities are available as required. If a center-balance is desired, connections are as shown in Fig. 3. If a plus maximum is desired, switch 79 is connected to (+ max.) terminal. If a negative maximum is desired, switch 79 is connected to (− max.) terminal.

A means for indicating the value of the neutralizing field as a measure of the magnetic field to be measured is shown as indicator 80. Pulley 81 of indicator 80 is driven by motor 58. Pulleys 81 and 85 carry wire 82 to which indicator and marker 83 is attached. Scale 84 provides a visual indication, while a graph is recorded on paper 86 which is moved by roll 87 and motor 88.

While preferred embodiments of the invention have been illustrated, it is to be understood that other modifications may be made within the scope of the invention by those skilled in the art.

What is claimed is:

1. The method of measuring the magnitude of a condition which comprises applying high-frequency current from a high-impedance source to a winding of a saturable core reactor, producing by said current a high-frequency magnetic field applied in opposite senses respectively to core members of said saturable core reactor, applying to said core members of said reactor in like sense a magnetic field of intensity representative of the magnitude of the condition to be measured, applying to said core members of said reactor in like sense a neutralizing field opposing the magnetic field representative of the magnitude of the condition under measurement, said reactor winding having maximum impedance in series with the high source impedance when said neutralizing field is of magnitude equal to that representative of the condition under measurement and having an impedance which decreases in substantially identical manner with unbalance of said opposed magnetic fields in either direction from the balance point, applying to said reactor a low-frequency magnetic field for modulating said reactor winding impedance about a value determined by the relative magnitudes of said opposed magnetic fields to produce modulation components which with respect to said low-frequency field have a phase relation therewith which reverses with reversal in direction of unbalance of said opposed fields, applying that fraction of the high-frequency voltage of said high-impedance source which appears across said reactor winding to a network including a discriminator to derive at least one modulation component whose phase is determined by the direction of unbalance of said opposed fields and whose amplitude is related to the extent of unbalance of said opposed fields in one direction or the other, and utilizing the modulation component so derived as a measure of the magnitude of said condition.

2. The method of measuring the magnitude of a condition which comprises applying a high-frequency voltage from a high-impedance source to a winding associated with core members of a saturable core reactor alternately to saturate said core members of said reactor at each peak of successive half-cycles of said high-frequency voltage, applying to said core members of said reactor in like sense a magnetic field of intensity representative of the magnitude of the condition to be measured, applying to said core members of said reactor in like sense a neutralizing field opposing the magnetic field representative of the magnitude of the condition under measurement, said reactor winding having maximum impedance in series with said high-impedance source when said neutralizing field is of magnitude equal to that representative of the condition under measurement and having an impedance which decreases in substantially identical manner with unbalance of said opposed magnetic fields in either direction from the balance point, applying to said reactor a low-frequency magnetic field which is effective because of the high impedance of said source to modulate the reactor winding impedance about a value determined by the relative magnitudes of said opposed magnetic fields to produce modulation components on said high-frequency voltage, which modulation components with respect to said low-frequency field have a phase relation which reverses with reversal in direction of unbalance of said opposed fields, deriving from the modulated high-frequency voltage output from said reactor, a modulation component whose phase is determined by the direction of unbalance of said opposed fields and whose amplitude is related to the extent of unbalance of said opposed fields in one direction or the other, and utilizing said derived modulation component as a measure of the magnitude of said condition.

3. The method of measuring the magnitude of a condition which comprises applying a high-frequency voltage to a first winding associated with core members of a saturable core reactor to produce magnetic fields of opposite senses, applying to a second winding associated with said core members of said reactor a voltage representative of the magnitude of the condition to be measured, applying to said second winding an opposing voltage, the difference between the opposing voltage and the voltage representative of the magnitude of the condition to be measured producing a current in said second winding and developing in said core members of said reactor in like sense a magnetic field representative in magnitude and direction of the difference between said opposed voltages, said reactor having maximum impedance when said opposing voltage is equal to the voltage representative of the condition to be measured, and having an impedance which decreases in substantially identical manner with unbalance of said opposed voltages in either direction from the balance point, applying to said core members of said reactor in like sense a low-frequency magnetic field for modulating the impedance about a value determined by the relative magnitudes of said opposed voltages to produce modulation components which with respect to said low-frequency field have a phase relation therewith which reverses with reversal in direction of unbalance of said opposed voltages, and detecting and utilizing at least one modulation component whose phase is determined by the direction of unbalance of said opposed voltages and whose amplitude is related to the extent of unbalance of said opposed voltages in one direction or the other.

4. A method of measuring the magnitude of a condition which comprises developing a first magnetomotive force in core members of a saturable magnetic structure, said first magnetomotive force being representative of the magnitude of the condition to be measured, developing a second and known magnetomotive force in the core members of said saturable magnetic structure with a polarity opposed to said first magnetomotive force, the difference between said first and second magnetomotive forces producing in the direction of the greater magnetomotive force a particular residual flux in said saturable magnetic structure, adding an alternating flux to said residual flux, the impedance of a winding associated with the saturable magnetic structure being maximum when said residual flux is zero and varying in response to the residual flux and in response to the alternating flux, a particular value of said residual flux in either direction causing substantially identical decreases in impedance, said alternating flux varying the impedance first in one direction and then in another direction, the phase of the resulting impedance alternations being representative of the particular direction of the residual flux, utilizing the impedance variations to modulate a higher frequency voltage applied from a high-impedance source thereof to produce opposing magnetic fields in said cores, demodulating that fraction of said higher frequency voltage which appears across said winding impedance to obtain modulation components representative of the magnitude and direction of said residual flux, adjusting said second and known magnetomotive force in a direction indicated by the phase of the modulation components and to the extent necessary to the reduction of said residual flux to zero, a reduction of said residual flux to zero being indicated by a maximum value of alternating voltage with substantially zero fundamental modulation component thereon, and utilizing such adjustment of said known second magnetomotive force as a measure of the first magnetomotive force.

5. A method of measuring the magnitude of a condition which comprises developing a first magnetomotive force in a pair of saturable magnetic cores, said first magnetomotive force being representative of the magnitude of the condition to be measured, developing a second and known magnetomotive force in the saturable magnetic cores with a polarity opposed to said first magnetomotive force, the difference between said first and second magnetomotive forces producing in the direction of the greater magnetomotive force a particular residual flux in said saturable magnetic cores, adding an alternating flux to said residual flux, the impedance of a winding associated with the saturable magnetic cores being maximum when said residual flux is zero and varying in response to the residual flux and in response to the alternating flux, a particular value of said residual flux in either direction causing substantially identical decreases in impedance, said alternating flux varying the impedance first in one direction and then in another direction, the phase of the resulting impedance alternations being representative of the particular direction of the residual flux, utilizing the impedance variations to vary the ratio of the impedance of said winding to the total output impedance of a source of alternating voltage in series therewith, detecting and utilizing that fraction of said alternating voltage appearing across said winding to obtain modulation components representative of the magnitude and direction of said residual flux, and adjusting said second and known magnetomotive force in a direction indicated by the phase of the modulation components as necessary to the reduction of said residual flux to zero, a reduction of said residual flux to zero being indicated by a maximum value of alternating voltage with substantially zero fundamental modulation component thereon.

6. A method of measuring the magnitude of a condition which comprises developing a first magnetic field of like sense in core members of a saturable magnetic structure, said first magnetic field being representative of the magnitude of the condition to be measured, developing a second and known magnetic field of like sense in core members of the saturable magnetic structure with a polarity opposed to said first magnetic field, the difference between said first and second magnetic fields producing in the direction of the greater magnetic field a particular residual flux in said saturable magnetic structure, adding an alternating flux to said residual flux concurrently in like sense to vary the total flux in the respective core members, the impedance of a winding differentially associated with the core members of said saturable magnetic structure being maximum when said residual flux is zero and varying in response to the residual flux and in response to the alternating flux, a particular value of said residual flux in either direction causing substantially identical decreases in impedance, said alternating flux varying the impedance first in one direction and then in another direction, the phase of the resulting impedance alternations being representative of the particular direction of the residual flux, utilizing the impedance variations of said winding to modulate the phase of an alternating voltage applied to said winding from a high-impedance source, applying that fraction of said alternating voltage which appears across said winding to a phase-discriminator to demodulate said alternating voltage and to obtain phase-modulation components representative of the magnitude and direction of said residual flux, and adjusting said second and known magnetic field in a direction indicated by the phase of the modulation components as necessary to the reduction of said residual flux to zero, a reduction of said residual flux to zero being indicated by a maximum value of alternating voltage with substantially zero fundamental modulation component thereon.

7. A method of measuring the magnitude of a condition which comprises developing a first magnetomotive force of like sense in core members of a saturable magnetic structure, said first magnetomotive force being representative of the magnitude of the condition to be measured, developing a second and known magnetomotive force of like sense in said core members of the saturable magnetic structure with a polarity opposed to said first magnetomotive force, the difference between said first and second magnetomotive forces producing in the direction of the greater magnetomotive force a particular residual flux in said saturable magnetic structure, adding an alternating flux to said residual flux in like sense to vary the total flux of the individual core members, the inductance of a winding differentially associated with the core members of said saturable magnetic structure being maximum when said residual flux is zero and varying in response to the residual flux and in response to the alternating flux, a particular value of said residual flux in either direction causing substantially identical decreases in inductance, said alternating flux varying the inductance first in one direction and then in another direction, the phase of the resulting inductance alternations being representative of the particular direction of the residual flux, utilizing the inductance variations of said winding to modulate the frequency of a higher-frequency alternating voltage applied to said winding from a high-impedance source, applying that fraction of said alternating voltage which appears across said winding to a frequency-discriminator to obtain modulation components representative of the magnitude and direction of said residual flux, and adjusting said second and known magnetomotive force in a direction indicated by the phase of the modulation components as necessary to the reduction of said residual flux to zero, a reduction of said residual flux to zero being indicated by a maximum value of alternating voltage with substantially zero fundamental modulation component thereon.

8. A measuring system comprising a saturable core reactor having core members, means for applying in like sense to said core members of the reactor a magnetic field of intensity representative of the magnitude of the condition to be measured, a control circuit including means for applying in like sense to said core members of the reactor a known magnetic field opposing the magnetic field representative of the magnitude of the condition to be measured, a high-impedance high-frequency source connected to a winding differentially associated with said core members of the reactor, said winding having maximum impedance effectively in series with the high-impedance of said source when said known magnetic field is equal and opposite to said field representative of the magnitude of the condition to be measured and having an impedance which decreases in substantially identical manner with unbalance of said opposed magnetic fields in either direction from the balance point, means for applying in like sense to said core members of the reactor a low-frequency magnetic field to modulate the impedance of said winding about a value determined by the relative values of said opposed magnetic fields, and measuring means including detecting means connected across said winding to derive from the modulated high-frequency voltage there appearing the modulation component whose phase is determined by the direction of unbalance of said opposed fields and whose amplitude is related to the extent of the unbalance of said opposed magnetic fields.

9. In a magnetic measuring system, a first circuit having a high-impedance source of high-frequency voltage and an excitation winding, a second circuit having a source of low-frequency voltage and a source of direct-current and a control winding, a third circuit having a source of voltage to be measured and an input winding developing a magnetic field of intensity related to the magnitude of said voltage to be measured, a magnetizable structure having core members similarly inductively associated with said control and input windings and oppositely inductively associated with said excitation winding whereby said high-frequency voltage saturates said magnetizable structure at each voltage peak and said low-frequency voltage modulates said high-frequency voltage and said voltage to be measured causes the modulation components produced thereby to be characteristic of the voltage to be measured, and balancing means connected to said first circuit and to said second circuit and having means connected across said high-impedance source for demodulating the modulated high-frequency voltage and having means for adjusting said source of direct-current in response to the phase relation between said modulation components and said low-frequency voltage for adjusting the intensity of the magnetic field produced by said control winding to equal and oppose the magnetic effect of said input winding in circuit with said voltage to be measured and to reduce the net magnetic field in said magnetizable structure to zero, the magnitude of the adjusted direct-current in said second circuit being a measure of said voltage of the third circuit.

10. In a magnetic measuring system, a first circuit having a source of high-frequency voltage and an excitation winding, a second circuit having a source of low-frequency voltage and a source of voltage to be measured and a source of known voltage and a control winding, a magnetizable structure having core members similarly inductively associated with one of said windings and oppositely inductively coupled to the other of said windings whereby said high-frequency voltage saturates said magnetizable structure at each voltage peak and said low-frequency voltage modulates said high-frequency voltage and said voltage to be measured causes the modulation components produced thereby to be characteristic of the voltage to be measured, and measuring means including balancing means connected to said first circuit and to said second circuit and having means for demodulating the modulated high-frequency voltage and having means operable in opposite senses in response to opposite senses of the phase relation between said modulation components and said low-frequency voltage for adjusting the intensity of the known voltage to equal and oppose the voltage to be measured and to reduce the net magnetic field produced in said magnetizable structure by the difference between the known voltage and the voltage to be measured to zero.

11. In a magnetic measuring system, a first circuit having a source of high-frequency voltage and an excitation winding, a second circuit having a source of low-frequency voltage and a modulation winding, a third circuit having a source of voltage to be measured and a known opposing voltage and a control winding, said third circuit developing a magnetic field representative of the difference between said known voltage and said voltage to be measured, a magnetizable structure having core members similarly inductively associated with said modulation and control windings and oppositely inductively associated with said excitation winding whereby said high-frequency voltage saturates said magnetizable structure at each voltage peak and said low-frequency voltage modulates said high-frequency voltage and said voltage to be measured causes the modulation components produced thereby to be characteristic of the voltage to be measured, and measuring means including balancing means connected to said first circuit and to said third circuit and having means for demodulating the modulated high-frequency voltage and having means operable in response to the phase relation between said modulation components and said low-frequency voltage for adjusting the known voltage to equal and oppose the voltage to be measured and to reduce the net magnetic field in said magnetizable structure to zero.

12. A method of measuring electromagnetic energy which comprises generating a high-frequency voltage at substantially constant current, applying said high-frequency voltage in opposite senses to core members of a saturable magnetic structure to produce opposed high-frequency magnetic fields proportional to said high-frequency voltage, modulating said high-frequency magnetic fields and said high-frequency voltage with a low-frequency magnetic field in like sense applied to the core members of said saturable magnetic structure, applying a magnetic field representative of the electromagnetic energy to be measured in like sense to the core members of said saturable magnetic structure to vary the average magnetic field resulting from the application of said high-frequency and low-frequency magnetic fields from zero average field strength to produce a particular modulation of said high-frequency field and of said high-frequency voltage, demodulating said modulated high-frequency voltage for modulation components, and utilizing said components as a measure of the direction and the magnitude of the electromagnetic energy to be measured.

13. A method of measuring electromagnetic energy which comprises generating a high-frequency voltage at substantially constant current, producing equal and opposed high-frequency magnetic fields in core members of a saturable magnetic structure, said fields being proportional to said high-frequency voltage, modulating said high-frequency magnetic fields and voltage with an added low-frequency magnetic field in like sense applied to said core members, applying in like sense to said core members a magnetic field which varies the average magnetic field of the added high-frequency and low-frequency magnetic fields from neutral field strength to a value representative of the direction and magnitude of the electromagnetic energy to be measured thereby causing the modulation of said high-frequency fields and of said high-frequency voltage to be representative of the direction and magnitude of the electromagnetic energy to be measured, demodulating said modulated high-frequency voltage for a modulation component representative of the direction and the magnitude of the electromagnetic energy to be measured, neutralizing said applied magnetic field with an opposing known magnetic field so as to produce maximum high-frequency voltage and substantially zero low-frequency modulation component thereon, and utilizing said opposing known magnetic field as a measure of said electromagnetic energy.

14. A system for measuring a magnetic field representative of a condition to be measured, comprising a constant-current source of high-frequency voltage, a source of low-frequency voltage, modulating means including a source of direct current and a saturable reactor having core members in like sense affected by said magnetic field and having windings associated therewith magnetically to couple said voltage sources for modulating the high-frequency voltage with the low-frequency voltage in a direction and to an extent representative of said magnetic field, and measuring means including balancing means connected to the modulated source of high-frequency voltage and to said direct-current source, said balancing means being responsive to the phase relation between the modulation components of said high-frequency voltage and the low-frequency voltage and having means adapted to adjust a magnetic field developed by said direct-current source to neutralize the magnetic field to be measured and thereby to provide maximum high-frequency voltage with substantially zero low-frequency modulation thereon.

15. A system for measuring a magnetic field, comprising a saturable magnetic structure having core members, an excitation winding coupled in opposite senses to the core members of said structure, a control winding coupled in like sense to the core members of said structure and having substantially zero coefficient of magnetic coupling to said excitation winding, a source of high-frequency voltage connected to said excitation winding, means for developing in like sense in the core members of said structure a magnetic field representative of a condition to be measured, a direct-current source in circuit with said control winding and adjustable to produce a known magnetic field to neutralize the magnetic field representative of the condition to be measured, means for applying a low-frequency voltage to said control winding to modulate said high-frequency voltage to produce a modulation corresponding to the difference between the known magnetic field and the magnetic field representative of a condition to be measured, and measuring means including detector means connected to the excitation winding for determining phase and magnitude of the high-frequency voltage's modulation components relative to the low-frequency voltage, said phase and magnitude being representative of the direction and magnitude of the condition to be measured.

16. A system for measuring a magnetic field, comprising a saturably magnetizable structure having core members, an excitation winding coupled in opposite senses to said core members of the structure, a control winding coupled in like sense to said core members of the structure and having substantially zero coefficient of magnetic coupling to said excitation winding, a high-impedance source of high-frequency voltage connected to said excitation winding and capable of saturating said magnetizable structure, means for developing in like sense in the core members of said magnetizable structure a magnetic field representative of a condition to be measured, a direct-current source in circuit with said control winding for producing a known magnetic field in said magnetizable structure, the magnetic field produced by said direct-current source being adjustable to neutralize the magnetic field representative of the condition to be measured, means for applying a low-frequency voltage to said control winding to modulate said high-frequency voltage to produce a modulation corresponding to the difference between the known magnetic field and the magnetic field representative of a condition to be measured, detector means connected to said excitation winding and adapted to determine magnitude and phase of the modulation component of the high-frequency voltage relative to the low-frequency voltage, and measuring means including balancing means connected to said detector means and to said direct-current source and responsive to said relative phase relation, said balancing means operating to adjust said direct-current source so as to neutralize the magnetic field in said magnetizable structure with a known opposing magnetic field and thereby to produce a maximum high-frequency voltage with zero low-frequency modulation thereon.

17. In a magnetic measuring system, a first circuit having a source of high-frequency voltage and a first winding, a second circuit having a source of low-frequency voltage and a source of known voltage and a second winding, a third circuit having a source of voltage to be measured and a third winding, a magnetizable structure having core members similarly inductively associated with said second and third windings and oppositely inductively associated with said first winding whereby said high-frequency voltage at its peaks saturates said magnetizable structure, said low-frequency voltage modulates said high-frequency voltage and said voltage to be measured causes the modulation components produced thereby to be characteristic of the voltage to be measured, and measuring means including balancing means connected to said first circuit and to said second circuit and having means for demodulating the modulated high-frequency voltage and having means operable in opposite senses in response to opposite senses of the phase relation between said modulation components and said low-frequency voltage for adjusting said known voltage to equal and oppose the voltage to be measured and to reduce to zero the net magnetic field produced by them in said magnetizable structure.

18. In a magnetic measuring system, a first circuit having a source of high-frequency voltage and a first winding, a second circuit having at least a source of low-frequency voltage and a source of known voltage and a second winding, a magnetizable structure having closed core members similarly inductively associated with the first winding and oppositely inductively associated with the second winding whereby said high-frequency voltage at its peaks saturates said magnetizable structure and said low-frequency modulates said high-frequency voltage, a source of voltage to be measured in circuit with a winding similarly inductively associated with said closed core members to cause modulation components characteristic of said voltage to be measured, and measuring means including balancing means operable in opposite senses in response to opposite senses of the phase relation between said modulation components and said low-frequency voltage for adjusting said known voltage to equal and oppose the voltage to be measured and to reduce to zero the net magnetic field produced by them in said magnetizable structure.

References Cited in the file of this patent

UNITED STATES PATENTS

| | | |
|---|---|---|
| 2,053,154 | La Pierre | Sept. 1, 1936 |
| 2,406,870 | Vacquier | Sept. 3, 1946 |
| 2,421,583 | Stuart | June 3, 1947 |
| 2,444,726 | Bussey | July 6, 1948 |
| 2,466,687 | Craddock et al. | Apr. 12, 1949 |
| 2,475,593 | Craddock et al. | July 12, 1949 |
| 2,480,575 | Hare | Aug. 30, 1949 |
| 2,520,677 | Fearon | Aug. 29, 1950 |
| 2,570,870 | Schmitt et al. | Oct. 9, 1951 |
| 2,584,571 | Frowe | Feb. 5, 1952 |

FOREIGN PATENTS

| | | |
|---|---|---|
| 619,525 | Great Britain | Mar. 10, 1949 |